US008256997B2

(12) United States Patent  
Brown (10) Patent No.: US 8,256,997 B2  
(45) Date of Patent: Sep. 4, 2012

(54) APPARATUS AND METHODS FOR A PNEUMATIC TRANSMISSION SYSTEM (75) Inventor: Michael E. Brown, Kings Mill, OH (US)

(73) Assignee: E.F. Bavis & Associates, Inc., Maineville, OH (US)

( * ) Notice: Subject to any disclaimer, the term of this patent is extended or adjusted under 35 U.S.C. 154(b) by 217 days.

(21) Appl. No.: 12/646,067

(22) Filed: Dec. 23, 2009

(65) Prior Publication Data

US 2010/0166509 A1 Jul. 1, 2010

Related U.S. Application Data (60) Provisional application No. 61/141,113, filed on Dec. 29, 2008.

(51) Int. Cl.
B65G 53/28 (2006.01)
(52) U.S. Cl. ............. 406/105; 406/13; 406/98; 406/104
(58) Field of Classification Search .............. 406/13, 406/98, 104, 105, 106
See application file for complete search history.

(56) References Cited

U.S. PATENT DOCUMENTS

| | | | | |
|---|---|---|---|---|
| 3,306,555 A * | 2/1967 | Tonne | | 406/19 |
| 3,836,288 A * | 9/1974 | Evans | | 417/307 |
| 4,180,354 A * | 12/1979 | Greene | | 406/112 |
| 4,358,226 A * | 11/1982 | Nagata et al. | | 406/82 |
| 4,466,761 A * | 8/1984 | Beltrop et al. | | 406/74 |
| 4,984,939 A * | 1/1991 | Foreman et al. | | 406/84 |
| 5,131,792 A * | 7/1992 | Grosswiller et al. | | 406/112 |
| 5,143,521 A * | 9/1992 | Dewitz | | 48/210 |
| 5,147,154 A * | 9/1992 | Scott | | 406/112 |
| 5,215,412 A * | 6/1993 | Rogoff et al. | | 406/112 |
| 5,299,891 A * | 4/1994 | Grosswiller et al. | | 406/112 |
| 5,562,367 A * | 10/1996 | Scott | | 406/13 |
| 5,584,613 A * | 12/1996 | Greene et al. | | 406/19 |
| 5,618,410 A * | 4/1997 | Wallace et al. | | 210/123 |
| 5,758,992 A * | 6/1998 | Sawallisch | | 406/151 |
| 6,039,510 A | 3/2000 | Greene et al. | | |
| 6,592,302 B2 * | 7/2003 | Balko | | 406/97 |
| 6,652,198 B2 * | 11/2003 | Nickoson | | 406/13 |

(Continued)

Primary Examiner — Joseph A Dillon, Jr.  
(74) Attorney, Agent, or Firm — Dinsmore & Shohl, LLP (57) ABSTRACT A blower assembly for a pneumatic carrier transmission system including a first blower for supplying air; a second blower for exhausting air, wherein the first and second blowers are connected in series; and a dual passageway connecting device connected to and in communication with the first and second blowers, the dual passageway connecting device comprising a connecting tee having a tee inlet, a first tee outlet in communication with the tee inlet, and a second tee outlet in communication with the tee inlet, a first valve connected to and in communication with the first tee outlet, a first passageway connected to and in communication with the first valve, a second valve connected to and in communication with the second tee outlet, and a second passageway connected to and in communication with the second valve, wherein the first blower is operable to supply air through the first passageway and the second blower is operable to exhaust air through the second passageway. A pneumatic carrier transmission system including a first terminal; a second terminal; a transmission conduit connecting the first and second terminals in fluid communication with each other; a dual passageway connected to and in fluid communication with the transmission conduit; a first blower for supplying air to the transmission conduit; a second blower for exhausting air from within the transmission conduit to outside the transmission conduit; a first, non-controlled check valve connected to the transmission conduit for exhausting air from within the transmission conduit; and a second, non-controlled check valve connected to the transmission conduit for permitting air into the transmission conduit.

8 Claims, 9 Drawing Sheets

U.S. PATENT DOCUMENTS

| | | | |
|---|---|---|---|
| 6,715,638 B2 * | 4/2004 | Moeks | 221/278 |
| 7,153,065 B2 * | 12/2006 | Lowell | 406/110 |
| 7,163,359 B2 * | 1/2007 | Moser | 406/74 |
| 7,234,898 B2 | 6/2007 | Brown | |
| 7,241,080 B2 * | 7/2007 | Klobucar et al. | 406/50 |
| 7,264,421 B2 | 9/2007 | Brown | |
| 7,326,005 B1 * | 2/2008 | Castro et al. | 406/192 |
| 7,686,546 B1 * | 3/2010 | Gromley | 406/179 |
| 7,751,930 B2 * | 7/2010 | Valerino, Sr. | 700/230 |
| 8,029,212 B2 * | 10/2011 | Valerino, Sr. | 406/4 |

* cited by examiner

APPARATUS AND METHODS FOR A PNEUMATIC TRANSMISSION SYSTEM

CROSS REFERENCE TO RELATED APPLICATIONS

This application claims priority to provisional application Ser. No. 61/141,113 filed Dec. 29, 2008 entitled "APPARATUS AND METHODS FOR A PNEUMATIC TRANSMISSION SYSTEM", which is incorporated herein by reference.

FIELD OF THE INVENTION

Embodiments disclosed herein generally relate to pneumatic transmission systems. More particularly, embodiments disclosed herein relate to a blower assembly for a pneumatic tube transmission system for banks, pharmacies, and other such commercial establishments.

BACKGROUND OF THE INVENTION

Pneumatic transmission systems are typically used to transmit articles from a first location to a second location which is remote from the first location. Pneumatic transmission systems usually include at least two stations, a conduit extending between the two stations and a carrier positioned within the conduit so as to be delivered by pneumatic pressure or other means.

SUMMARY OF THE INVENTION

Accordingly, the embodiments disclosed herein are intended to address and obviate problems and shortcomings and otherwise improve previous pneumatic transmission systems.

One embodiment of the present invention is a blower assembly for a pneumatic carrier transmission system including a first blower for supplying air; a second blower for exhausting air, wherein the first and second blowers are connected in series; and a dual passageway connecting device connected to and in communication with the first and second blowers, the dual passageway connecting device comprising a connecting tee having a tee inlet, a first tee outlet in communication with the tee inlet, and a second tee outlet in communication with the tee inlet, a first valve connected to and in communication with the first tee outlet, a first passageway connected to and in communication with the first valve, a second valve connected to and in communication with the second tee outlet, and a second passageway connected to and in communication with the second valve, wherein the first blower is operable to supply air through the first passageway and the second blower is operable to exhaust air through the second passageway.

Another embodiment of the present invention is a pneumatic carrier transmission system including a first terminal; a second terminal; a transmission conduit connecting the first and second terminals in fluid communication with each other; a dual passageway connected to and in fluid communication with the transmission conduit; a first blower connected to and in fluid communication with the dual passageway, the first blower for supplying air to the transmission conduit; a second blower connected in series to and in fluid communication with the first blower opposite the dual passageway, the second blower for exhausting air from within the transmission conduit to outside the transmission conduit; a first, non-controlled check valve connected to and in fluid communication with the transmission conduit for exhausting air from within the transmission conduit to outside the transmission conduit; and a second, non-controlled check valve connected to and in fluid communication with the transmission conduit for permitting air into the transmission conduit from outside the transmission conduit, wherein the transmission system transports a carrier within the transmission conduit between the first and second terminals.

Yet another embodiment of the present invention is a pneumatic carrier transmission system including a first terminal having a first terminal end opening; a second terminal having a second terminal end opening; a transmission conduit connecting the first and second terminals in fluid communication with each other; a first end door movably connected to the first terminal adjacent to the first terminal end opening, the first end door moves to open and close the first terminal end opening; a second end door movably connected to the second terminal adjacent to the second terminal end opening, the second end door moves to open and close the second terminal end opening; a blower assembly comprising a first blower, a second blower connected in series to the first blower, and a dual passageway connecting device comprising first and second passageways and first and second check valves connected to the first and second passageways, wherein the dual passageway connecting device connects the in series, first and second blowers to the transmission conduit such that the first blower supplies air through the first passageway and first check valve into the transmission conduit and the second blower exhausts air from the transmission conduit through the second passageway and second check valve; an exhaust check valve connected to and in fluid communication with the transmission conduit operable to exhaust air from within the transmission conduit to outside the transmission conduit; and an intake check valve connected to the first end door and in fluid communication with the transmission conduit for permitting air to flow into the transmission conduit from outside the transmission conduit, wherein the transmission system transports a carrier within the transmission conduit between the first and second terminals.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

FIG. 9C is a schematic, bottom planar view of the end door assembly of FIG. 9B without the first and second telescoping rods.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION

Reference will now be made in detail to various embodiments of the invention, examples of which are illustrated in the accompanying drawings, wherein like numerals indicate similar elements throughout the views.

Pneumatic transmission systems are used in "drive-thru" terminals for bank facilities, pharmacies, etc., where business is conducted via a carrier transmitted between the commercial establishment (e.g., bank) and the remote "drive-thru" terminal. Other exemplary uses include sending documents between floors in a building, from one office to another office, or from one building to another building, wherein such floors, offices, or buildings are located some distance apart.

Embodiments disclosed herein comprise a blower assembly, more particularly a pneumatic transmission system for transferring items between a teller terminal and a customer terminal during a transaction at a commercial facility such as a bank or a pharmacy. While the embodiments illustrated herein describe one or more blower assemblies and/or pneumatic tube transmission systems, as will be apparent to those of ordinary skill in the art, the blower assemblies may be employed in other transmission systems as well.

Referring to FIGS. 1-9, an embodiment of a pneumatic transmission system is shown as 10. Pneumatic transmission system 10 generally includes a first terminal 12 positioned, for example, at a teller station (i.e., a teller terminal), a second terminal 14 positioned, for example, at a customer station (i.e., a customer terminal), a transmission conduit 20 connecting the first and second terminals together in fluid communication, a first terminal end opening 23 disposed at an end of the transmission conduit 20 positioned at the first terminal 12, a first terminal end door assembly 101 operable to open and close the first terminal end opening 23, a second terminal end opening 24 disposed at an end of the transmission conduit 20 positioned at the second terminal 14, a second terminal end door assembly 102 operable to open and close the second terminal end opening 24, and a blower assembly 99. The exemplary pneumatic transmission system 10 may comprise a separate carrier 1 and be operable to transport the carrier 1 between the first and second terminals 12, 14, respectively, on command and/or automatically. Both, first and second terminal end doors 101 and 102, may comprise the pneumatic transmission system end doors shown and described in U.S. Pat. Nos. 7,264,421 and 7,234,898, which are herein incorporated by reference in their entirety.

Still referring to FIGS. 1-7, the blower assembly 99 may comprise a first blower 30, a second blower 40 connected in series to the first blower 30, and a dual passageway connecting device 50 connected to the first blower 30, opposite the second blower 40. The dual passageway connecting device 50 is operable to connect the in-series blowers 30, 40 to the transmission conduit 20 at two separate and distinct locations. In one embodiment, the dual passageway connecting device 50 may comprise a connecting tee 59 having a tee inlet 53, a first tee outlet 55, and a second tee outlet 54. The blower assembly 99 may further comprise a first valve 61 connected to the first tee outlet 55, a first passageway 51 connected to the first valve 61 opposite the first tee outlet 55, a second valve 62 connected to the second tee outlet 54, and a second passageway 52 connected to the second valve 62 opposite the second tee outlet 54. As shown, the first passageway 51 connects first tee outlet 55 (and thus first and second, in series, blowers 30 and 40) to the transmission conduit 20 at the second terminal 14 adjacent the second terminal end opening 24 at a first connection point 56. In addition, the Figures show the second passageway 52 connecting the second tee outlet 54 (and thus first and second, in series, blowers 30 and 40) to the transmission conduit 20 at a second connection point 57. In this embodiment, the second connection point 57 is spaced apart from the second terminal end opening 24 and thus the first connection point 56 at a point along the conduit 20 above the second terminal end opening 24. It is understood that the first and second connection points 56 and 57, respectively, may connect to the transmission conduit 20 at various other locations as long as such connections perform the necessary functions as shown and described herein. Blower assembly 99 may contain more than two blowers and/or two or more check valves as desired.

The first and second valves 61 and 62 may be any conventional or yet-to-be-developed valves. In one particular embodiment, first and second valves 61 and 62 are check valves, more particularly non-controlled, check valves. 'Non-controlled' and/or 'non-controlled valve', as used herein, means that the valve operates, i.e., opens and closes, without the use and/or need of a controller and/or drive mechanism (e.g., solenoid drive, pneumatic drive, other drive mechanisms, etc.) to cause the valve to operate, i.e., open and close. For example, a check valve, wherein air flow and/or pressure differential across the valve or lack thereof causes the valve to open and/or close, and not a controller and/or drive mechanism. As such, a 'non-controlled check valve', as used herein, means a mechanical device, a valve, which normally allows fluid (e.g., gas) to flow through it in only one direction, and that the valve operates to all this fluid to flow in that one direction without the use and/or need of a controller and/or drive mechanism (e.g., solenoid drive, pneumatic drive, other drive mechanisms, etc.) to cause the valve to operate, e.g., a pressure differential across the valve will cause it to open and/or close. In another example, first and second valves 61 and 62 comprise ball and cage check valves as described and defined below herein with reference to an intake valve 80 and shown in FIGS. 8A-C. The description of the intake valve 80 set forth below is incorporated herein by reference as description of one potential embodiment of the first and second valves 61 and 62.

Figure 1:
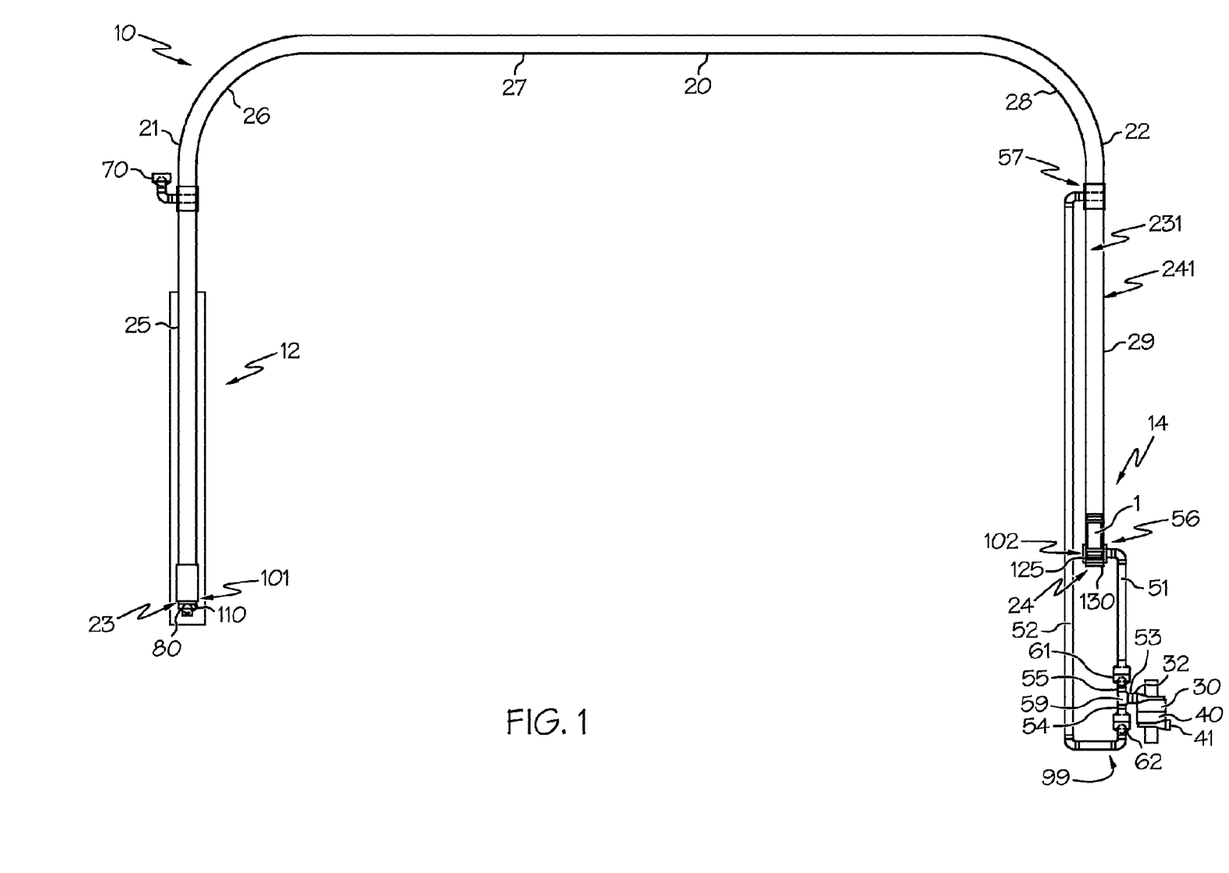
FIG. 1 is a schematic representation of an embodiment of the pneumatic transmission system.
Figure 2:
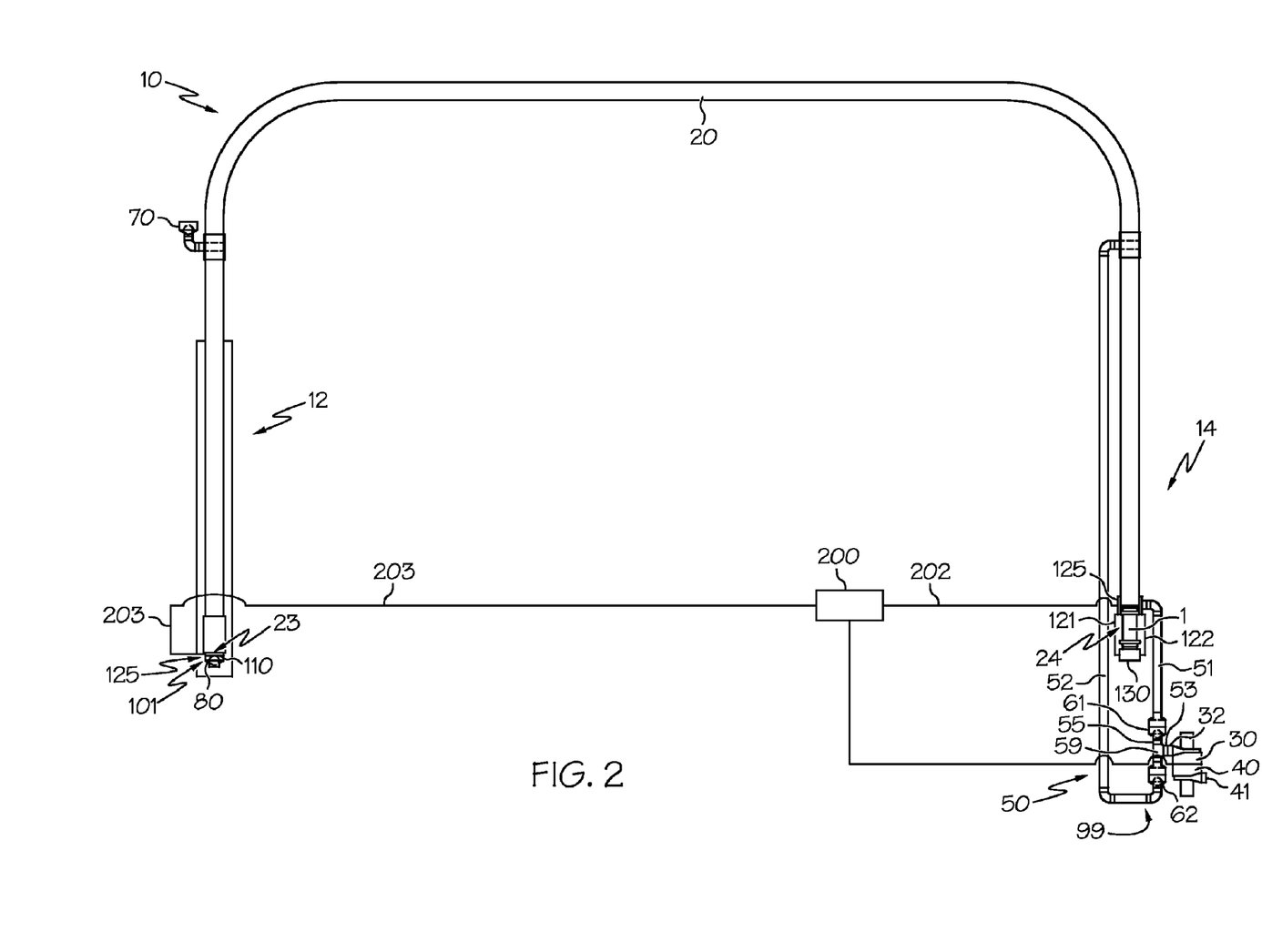
FIG. 2 is a schematic representation of the pneumatic transmission system illustrated in FIG. 1, showing the second terminal end door in the "open" position for loading and/or unloading of a carrier and the first terminal end door in the "closed" position.

The first and second blowers 30 and 40 may be any conventional blowers as known to one of ordinary skill in the art. The first and second blowers 30 and 40 may comprise an impellor (not shown) driven by a motor (not shown). The first and second blowers 30 and 40 may comprise a tangential blower, which has benefits over prior art centrifugal blowers that are generally used in pneumatic transmission systems. Such a tangential blower provides for the air to flow from an inlet tangentially around the stator and/or rotor of the motor to an outlet, preventing dirt and debris from damaging the stator and rotor of the motor. Tangential blowers that may be used for first and second blowers 30 and 40 are shown and described in one or more of U.S. Pat. Nos. 7,264,421 and 7,234,898, which are both herein incorporated by reference in their entirety. In contrast, centrifugal blowers blow the air (and dirt and debris) through the stator and/or rotor, thus potentially damaging and/or reducing the potential life of the blower. However, it is understood that the present invention may include centrifugal blowers for first and/or second blowers 30 and 40. Referring specifically to FIG. 2, the first and second blowers 30 and 40 may be connected to the controller 200 (e.g., micro-controller) via an electrical conductor 201, or a separate controller (not shown). The controller can be programmed to receive signals from a user interface such as a 'send', 'open', and/or 'close' button(s), or some combination thereof. Such controller and control system may be any conventional system commercially available and known to one of ordinary skill in the art and thus need not be described herein in detail.

Each of the first and second blowers 30 and 40 may include first and second inlets and first and second outlets, respectively. As set forth above and shown in FIGS. 1-3, the first and second blowers 30 and 40 are connected in series, wherein an inlet of the first blower 30 is connected to an outlet of the second blower 40. Additionally, an outlet 32 of the first blower 30 is connected to the tee inlet 53. As such, in this embodiment, an inlet 41 of the second blower 40 may comprise an inlet of the entire blower assembly 99, which may permit ambient air to enter into the blower assembly 99 as illustrated by Arrow D in FIG. 3. In this embodiment, the first blower 30 is operable to draw ambient air in through second blower inlet 41, out of the first blower's outlet 32 into tee inlet 53, through the tee 59, the first check valve 61, and the first passageway 51, and into the transmission conduit 20 at first connection point 56. In addition, the second blower 40 is operable to exhaust air from the transmission conduit 20 at second connection point 57, through the second passageway 52, the second check valve 62, and the tee 59, into the first blower outlet 32, through the first and second blowers 30 and 40, and out of the inlet 41 of the second blower (See FIG. 7).

The first terminal 12 may be positioned at or inside a building (e.g. a pharmacy) at a teller station such that a teller may insert and/or remove carrier 1 from pneumatic transmission system 10 to transport items inside carrier 1 to and/or from a customer located at the second terminal 14 positioned at a customer station (e.g., a drive thru station). The second terminal 14 may be positioned a spaced-apart distance from the first terminal 12. For example, generally the second terminal 14 may be positioned a car lane distance from the first terminal 12. Additionally, any additional customer terminal(s) (not shown) may be positioned an additional car lane distance from the second terminal 14 and so on.

Also, the first terminal 12 may comprise additional items such as conventional teller windows, intercom system, slide drawer, etc., as known to one of ordinary skill in the art. Also, the first terminal 12 may comprise or be incorporated into a desk and/or working station. In addition, the second terminal 14 may comprise an intercom system and other conventional customer terminal components as known to one of ordinary skill in the art. The pneumatic transmission system 10 may also include a teller user interface (not shown) and a customer user interface (not shown), both of which permit the teller and/or the customer to send the carrier 1 to the opposite terminal and communicate with each other. For example, the teller and customer user interfaces may include a "send" push button to initiate the operation of the system to transmit the carrier 1 to the opposite terminal end and a "speak" push button to operate an intercom system. Such user interfaces may be any conventional user interface as known to one of ordinary skill in the art and need not be described herein.

The transmission conduit 20 may comprise any conventional or yet-to-be developed pneumatic transmission conduit as known to one of ordinary skill in the art. Such a transmission conduit may be fabricated from a variety of known materials such as metals, plastics, composites, combinations thereof, or any other conventional materials as known to one of ordinary skill in the art. In addition, the conduit may have a variety of shapes and sizes without departing from the spirit and scope of the present invention. As such, the first and second end doors 110 and 130 may comprise a shape that is complimentary to the shape of the transmission conduit 20. For example, as described above, the transmission conduit 20 has a circular-shaped cross section, and the end doors 110 and 130 have a corresponding circular-shaped cross section. As another example, the transmission conduit 20 may comprise a square-shaped cross section, and thus the end doors may comprise a corresponding square-shaped cross section.

The conduit may be colored, opaque, translucent or any combination thereof. In the embodiment shown, transmission conduit 20 is a tubular conduit made from metal. The transmission conduit 20 has a length sufficient enough to connect the first terminal 12 with the second terminal 14. As described above, it is understood that the pneumatic transmission system 10 may include more than one customer terminal, and thus the transmission conduit 20 may connect the first terminal 12 to more than one customer terminal, including the second terminal 14.

Transmission conduit 20 includes sidewall 241 that defines an interior space 231 configured to permit carrier 1 to travel therein. In this embodiment, the transmission conduit 20 has a first straight portion 25 that extends upward from the first terminal end opening 23 and connects to a first elbow 26. A second straight portion 27 connects to the first elbow 26, opposite the first straight portion 25. A second elbow 28 connects to the second straight portion 27 opposite the first elbow 26. The second elbow 28 connects to a third straight portion 29, opposite the second straight portion 27. The third straight portion 29 extends from the second elbow 28 downwardly to the second terminal end opening 24. It is contemplated that the transmission conduit 20 may have any number of configurations, designs, and shapes and thus any number of straight portions and elbows. As such, it is also contemplated that the transmission system 10 may be an overhead system as shown in the Figures or an underground system (not shown).

The pneumatic transmission system 10 may also include an exhaust valve 70 connected to the transmission conduit 20. The exhaust valve 70 may be any conventional or yet-to-be-developed valve. In one embodiment, exhaust valve 70 is a check valve, i.e., only permitting air to exit the conduit 20 through exhaust valve 70 and not to enter into the conduit 20 through exhaust valve 70. In another embodiment, exhaust valve 70 is a non-controlled, check valve. In yet another example, exhaust valve 70 comprises a ball and cage check valve as described and defined below herein with reference to the intake valve 80 and shown in FIGS. 8A-C. The description of the intake valve 80 set forth below is incorporated herein by reference as description of one potential embodiment of exhaust valve 70.

As described above, pneumatic transmission system 10 and all its components are configured to transport the carrier 1 between the first terminal 12 and the second terminal 14 within the transmission conduit 20 using air (i.e., pressure differential on opposite sides of the carrier within the transmission conduit 20). The carrier 1 may be any conventional carrier used in pneumatic transmission systems as known to one of ordinary skill in the art. In the embodiment, the carrier 1 is a cylindrical-shaped carrier having a side wall 2 connected to opposite end walls 3 that form a cylindrical cavity therein and a door that may be movably attached to the side wall to allow entry into the cavity. In addition, carrier 1 may include seals attached to an outer surface of the carrier to create a seal between the carrier 1 and an interior surface of sidewall 241 of the transmission conduit 20.

Referring to FIG. 8, an embodiment of the first end door assembly 101 is shown. The first end door assembly 101 may comprise a first end door 110 having an outer surface 111, a seal 112 attached to the outer surface 111, and a end door actuator 120. The first end door assembly 101 may also comprise an end housing 114 that connects to an end of the transmission conduit 20 at the first terminal 12. In one embodiment, the first end door 110 may be cylindrical-shaped and operable to insert at least partially into the first terminal end opening 23 such that the seal 112 forms a sealing engagement with an inside surface 115 of the end housing 114.

The end door actuator 120 may comprise one or more telescoping rods (e.g., first and second telescoping rods 121 and 122) that may connect the first end door 110 to the end housing 114. As shown in FIGS. 8B and 8C, the first and second telescoping rods 121 and 122 may be retracted inwardly toward the first terminal end opening 23 into a contracted position as designated by Arrow A such that the first end door 110 is at least partially inserted into the first terminal end opening 23 (e.g., plugs the first terminal end opening 23), thus closing the first terminal end opening 23. When in this position, seal 112 seats (e.g., seals) against sidewall 115, sealing the first terminal end opening 23 and preventing ambient air (e.g., air from outside transmission conduit 20) from entering into interior space 22 or air exiting from interior space 22 through first terminal end opening 23 as shown in FIG. 8B. The position of first end door 110 shown in FIG. 8B is its 'closed position'. As shown, such a door and sealing design minimizes sealing surfaces and eliminates the need for sliding seals as found in many conventional door systems, which significantly reduces costs and increases operational efficiency and availability.

Figure 8A:
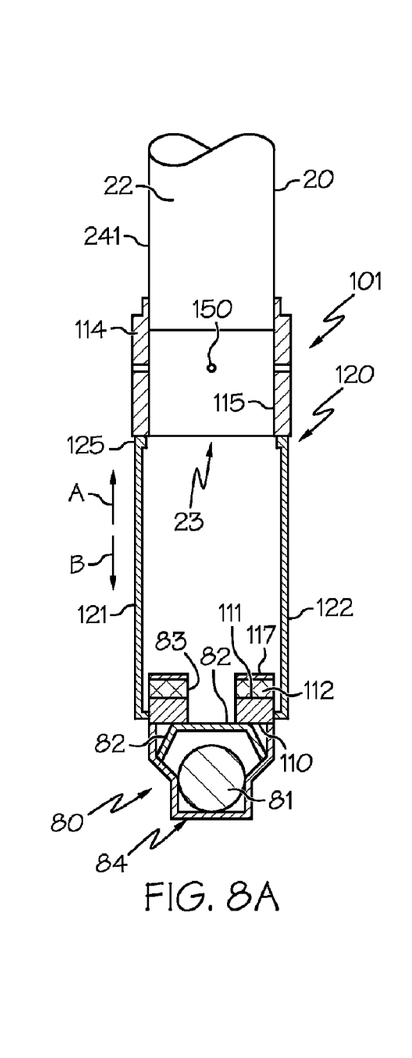
FIG. 8A is a schematic, cross sectional representation of an embodiment of a pneumatic transmission system end door assembly having an intake valve, wherein the end door assembly is in an open position.
Figure 8B:
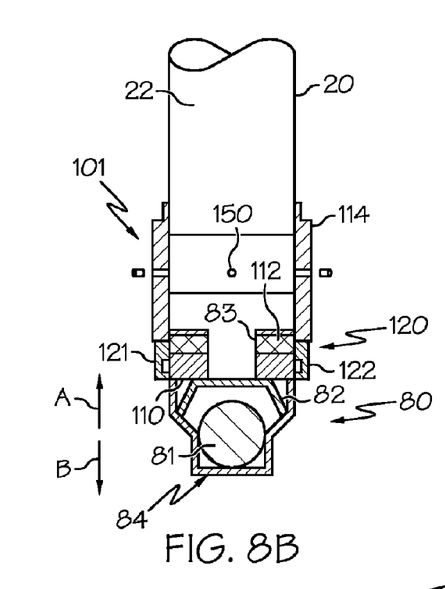
FIG. 8B is a schematic, cross sectional representation of the end door assembly of FIG. 8A, wherein the end door assembly is in a closed position and the intake valve is in a closed position.
Figure 8C:
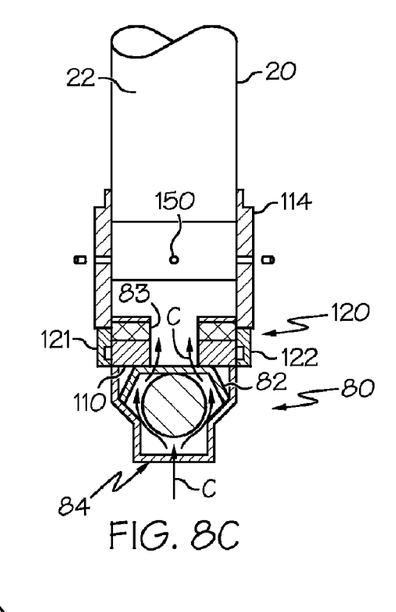
FIG. 8C is a schematic, cross sectional representation of the end door assembly of FIG. 8A, wherein the end door assembly is in a closed position and the intake valve is in an open position.
Figure 8D:
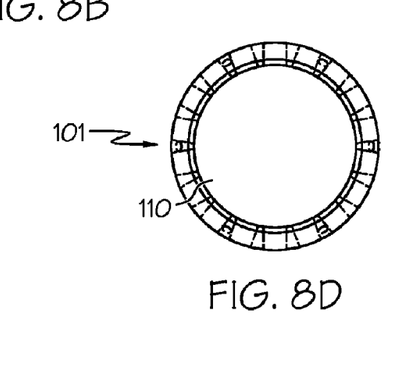
FIG. 8D is a schematic, bottom planar view of the end door assembly of 8B without the intake valve and the first and second telescoping rods.

As shown in FIG. 8A, the first and second telescoping rods 121 and 122 may be extended outwardly away from the first terminal end opening 23 as designated by Arrow B into an extended position such that the first end door 110 is removed from the first terminal end opening 23 (e.g., un-plugs from the end opening 23), thus opening the first terminal end opening 23 and permitting a carrier 1 to be inserted or removed from the transmission conduit 20. In this position, the first end door 110 is in an 'open position'. The carrier 1 may be placed on a top surface 117 of the first end door 110. The end door actuator 120 may comprise a solenoid, pneumatic, motor, or other conventional drive mechanism to move the first end door 110 between the closed and open positions. For example, the end door actuator 120 may comprise a solenoid 125 connected in electrical communication with a controller 200 via electrical conductor 203 or a separate controller (not shown) and connected to the first and second telescoping rods 121 and 122 as known to one of ordinary skill in the art. The solenoid 125 either retracts or extends the first and second telescoping rods 121 and 122 in response to a received control signal from the controller 200.

In the embodiment shown, the first end door assembly 101 also, optionally, comprises an intake valve 80 connected to the first end door 110. As such, the first end door 110 may comprise a passageway 83 therethrough in order to permit air to flow through the intake valve 80, through the passageway 83, and into the transmission conduit 20. The intake valve 80 may comprise any conventional or yet-to-be developed valve. In one embodiment, intake valve 80 may comprise a check valve, i.e., only permitting ambient air to enter into conduit 20 through intake valve 80 as designated by the Arrows C shown in FIG. 8C, but not permitting air to exit conduit 20 through intake valve 20 (i.e., a one-way valve). In another embodiment, intake valve 80 may be a non-controlled, check valve. As an example and shown in FIGS. 8A-8C, intake valve 80 is a non-controlled, check valve as defined above herein that comprises a ball and cage check valve. A 'ball and cage check valve', as used herein, is a valve, wherein the movement of the ball is restricted within the refines of a cage, and the cage provides enough room for the ball to either engage an internal conduit opening to close the valve and prevent fluid flow in one direction, or disengage from the internal conduit opening to open the valve and permit fluid flow in the opposite direction and as shown in FIGS. 8A-8C. As such, a ball and cage check valve, as used herein, is a non-controlled, check valve as defined above herein.

Specifically, the ball and cage check valve 80 comprises an inlet 84, a ball 81, a cage 82 positioned between the passageway 83 and the ball 81 to prevent the ball 81 from engaging and sealing the passageway 83. As shown in FIG. 8B, the intake valve 80 is also in its 'closed position', i.e., the ball 81 is engaged against the inlet 84, thus creating a seal and preventing any air from entering into the transmission conduit 20 through the intake valve 80. In addition to the intake valve 80 being in its 'closed position' in FIG. 8B, the first end door 110 is also in its 'closed position'. As such, no air is permitted to enter the transmission conduit 20 at the first terminal end 12 or the first terminal end opening 23. In order to create a seal and thus close inlet 84, the size of the ball 81 will be larger than the inlet's (84) opening. In FIG. 8C, the intake valve 80 is in the 'open position', i.e., the ball 81 is disengaged (e.g., unsealed) from the inlet 84 and against the cage 82, thus permitting air to enter into the transmission conduit 20 through the inlet 84, around the ball 81, through the passageway 83, and into the transmission conduit 20 as illustrated by the Arrows C. As shown in FIG. 8C, although the intake valve 80 is in the 'open position', the first end door 110 is still in its 'closed position'. As set forth above herein, the intake valve 80 is a non-controlled, check valve because the valve (e.g., the ball 81) moves between the 'open' and 'closed' valve positions due to the air flow and/or pressure differential across the valve, and not due to any other force such as from a controller, drive mechanism (e.g., solenoid), or other drive mechanisms. It is understood that the non-controlled, check valves herein may be spring-biased into a normal position. It is also understood that in other embodiments, the non-controlled, check valves herein do not include spring-biased valves that are spring-biased into a normal position.

It is also understood that the first end door assembly 101 may not include the end housing 114. As such, the first terminal end opening 23 will be the actual opening at the end of the transmission conduit 20. Also, in this alternative embodiment, the end door actuator 120 (e.g., first and second telescoping rods 121 and 122) may be connected directly to the transmission conduit 20, adjacent to the first terminal end opening 23 such that the first end door 110 inserts directly into and out of the first end opening within the transmission conduit.

Figure 9A:
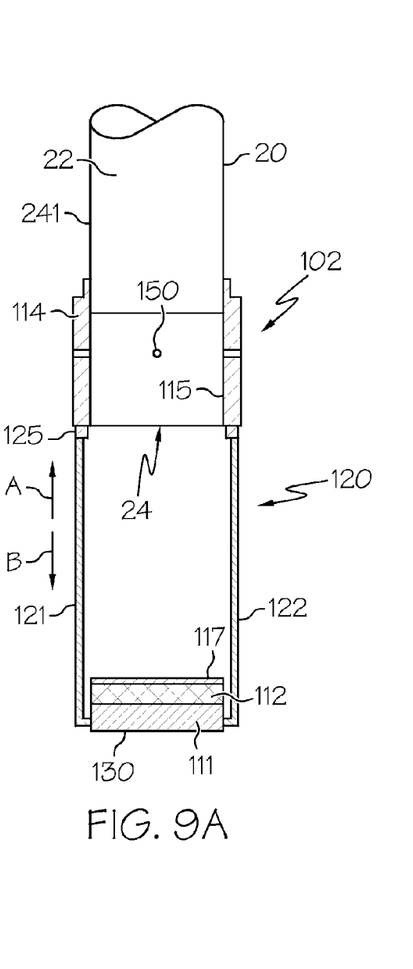
FIG. 9A is a schematic, cross sectional representation of another embodiment of a pneumatic transmission system end door assembly, wherein the end door assembly is in an open position.
Figure 9B:
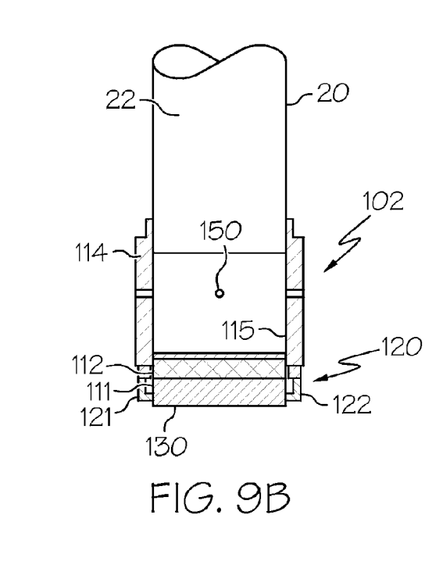
FIG. 9B is a schematic, cross sectional representation of the end door assembly of FIG. 9A, wherein the end door assembly is in a closed position.

FIG. 9 shows an embodiment of a second end door assembly 102. The second end door assembly 102 may comprise a second end door 130 having an outer surface 111, a seal 112 attached to the outer surface 111, and a end door actuator 120. The second end door assembly 102 may also comprise an end housing 114 that connects to an end of the transmission conduit 20 at second terminal 14. In one embodiment, the second end door 130 may be cylindrical-shaped and operable to insert at least partially into the second terminal end opening 24 such that the seal 112 forms a sealing engagement with an inside surface 115 of the end housing 114.

The end door actuator 120 may comprise one or more telescoping rods (e.g., first and second telescoping rods 121 and 122) that may connect the second end door 110 to the end housing 114. As shown in FIG. 9B, the first and second telescoping rods 121 and 122 may be retracted inwardly toward the second terminal end opening 24 into a contracted position as designated by Arrow A such that the second end door 130 is at least partially inserted into the second terminal end opening 24 (e.g., plugs the second terminal end opening 24), thus closing the second terminal end opening 24. When in this position, seal 112 seats (e.g., seals) against sidewall 115, sealing the second terminal end opening 24 and preventing ambient air (e.g., air from outside transmission conduit 20) from entering into interior space 22 through the second terminal end opening 24 as shown in FIG. 9B. The position of second end door 130 shown in FIG. 9B is its 'closed position'. As shown, such a door and sealing design minimizes sealing surfaces and eliminates the need for sliding seals as found in many conventional door systems, which significantly reduces costs and increases operational efficiency and availability.

As shown in FIG. 9A, the first and second telescoping rods 121 and 122 may be extended outwardly away from the second terminal end opening 24 as designated by Arrow B into an extended position such that the second end door 130 is removed from the second terminal end opening 24 (e.g., un-plugs from the end opening 23), thus opening the second terminal end opening 24 and permitting a carrier 1 to be inserted or removed from the transmission conduit 20. In this position, the second end door 130 is in an 'open position'. The carrier 1 may be placed on a top surface 117 of the second end door 130. The end door actuator 120 may comprise a solenoid, pneumatic, or other conventional drive mechanism as known to one of ordinary skill in the art to move the second end door 130 between the closed and open positions. For example, the end door actuator 120 may comprise a solenoid 125 connected in electrical communication with the controller 200 via an electrical conductor 202 or a separate controller (not shown) and connected to the first and second telescoping rods 121 and 122 as known to one of ordinary skill in the art. The solenoid 125 either retracts or extends the first and second telescoping rods 121 and 122 in response to a received control signal from the controller 200.

In an alternative embodiment, the same configuration as described with reference to the first end door assembly 101, including the intake valve 80, may be used for the second end door assembly 102, which such description is herein incorporated by reference in its entirety. As such, the system 10 may comprise an intake check valve at each of the first and second end door assemblies 101 and 102, respectively. In another alternative embodiment, the first and second end door assemblies 101 and 102 may not include an intake valve and thus comprise the same or similar configuration as the second end door assembly 102 shown and described above herein. In yet another alternative embodiment, the first end door assembly 101 may not include an intake valve (e.g., valve 80), but the second end door assembly 102 may include an intake valve the same as or similar to the intake valve 80 shown in FIG. 8, which such description is herein incorporated by reference in its entirety.

The design of the first and second end door assemblies 101 and 102, including the intake valve 80, reduce the cost of fabrication and operation as well as lowers maintenance requirements. In another embodiment, the first and second end doors may seat up against the end of the housing 114 or a sidewall 241 of the transmission conduit 20, closing off both end openings 23 and 24, rather than physically inserting themselves into the end openings as described in the embodiment set forth above.

Referring back to FIGS. 1-7, an embodiment of the pneumatic transmission system 10 in operation will be described. Assuming the second end door 130 is in the 'open position' and the first end door 110 is in the 'closed position' as shown in FIG. 2 (See also FIGS. 9A and 8B, respectively), a user may position the carrier 1 onto the top surface 117 of the second end door 130 and activate the system 10 (e.g., by pressing "start" or "send" button (not shown) located on a user interface to transmit the carrier 1 from the second terminal 14 to the first terminal 12. Once the system 10 has been activated, the second end door 130 will close the second terminal end opening 24 by moving toward and at least partially into the second terminal end opening 24, sealing the seal 112 against the inside surface 115 of the transmission conduit 20. In doing this, the second end door 130 also moves the carrier 1 into the second terminal end opening 24 and inside the conduit 20.

Figure 3:
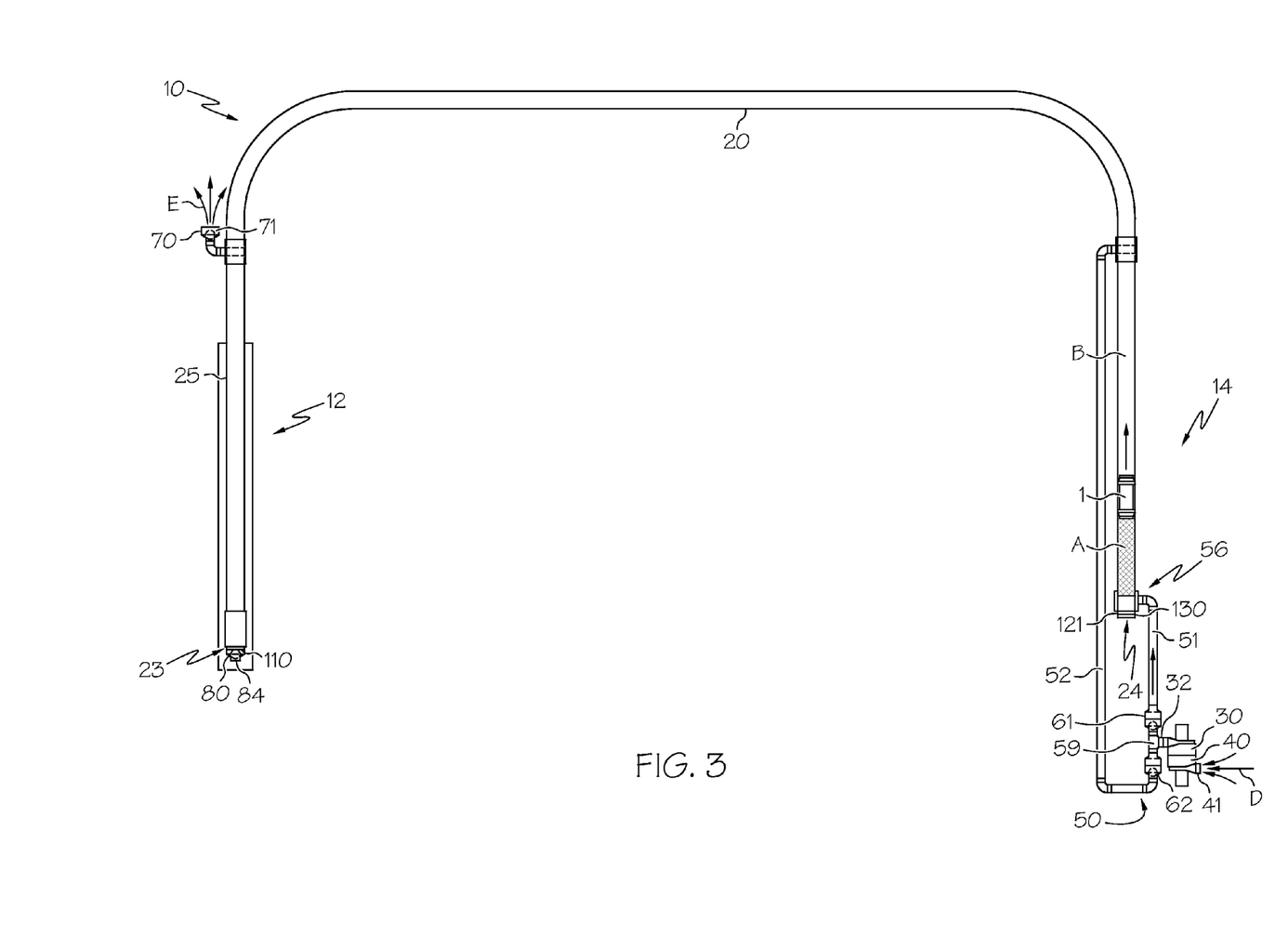
FIG. 3 is a schematic representation of pneumatic transmission system illustrated in FIG. 1, showing the first blower supplying air to the transmission conduit to create pressure in space A between the customer terminal and the carrier.

Once the second end door 102 is closed, the first blower 30 begins supplying air to the transmission conduit 20 at the connection point 56 which in this embodiment is at and/or substantially near the second terminal end opening 24 as shown in FIG. 3. The first blower 30 draws air into the inlet 41 of the second blower 40 as illustrated by Arrow D, through the second blower 40, into the inlet of the first blower 30, through the first blower 30, and exhausts (supplies) air out of the outlet 32 of the first blower 30 into the dual passageway connector device 50. Specifically, the air flows into the dual passageway connector device 50 through the tee inlet 53 and causes the second check valve 62 to close (e.g., pushes its ball into a sealed position over an inlet of the second passageway 52) and the first check valve 61 to open (e.g., pushes its ball into an unsealed position from the first passageway 51), creating an air passageway to the transmission conduit 20 through the first passageway 51.

Figure 4:
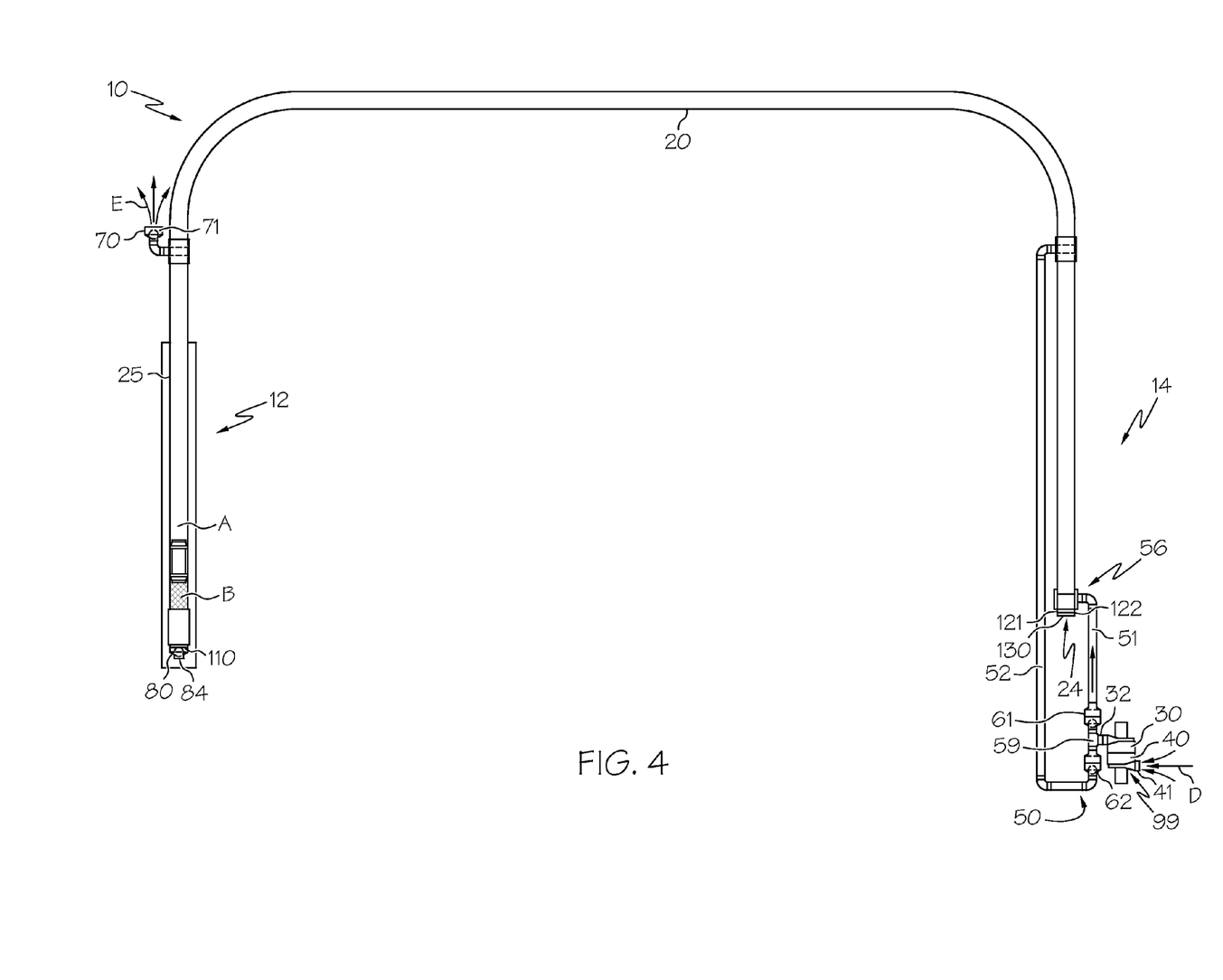
FIG. 4 is a schematic representation of a pneumatic transmission system illustrated in FIG. 1, showing the carrier arriving at the teller terminal.

As air is supplied to transmission conduit 20 via this flow path, the air pressure (cross hatching pattern designated as A within conduit 20 in FIG. 3) builds within conduit 20 between one end of the carrier 1 and the second end door 130. This pressure A creates a pressure differential between the atmospheres within the conduit 20 on opposite sides of the carrier 1. In this operational configuration, the pressure A (on the second terminal side of the carrier 1) is greater than the pressure B (on the first terminal side of the carrier) as shown in FIG. 3. As such, the air pressure A begins to propel the carrier 1 toward the first terminal 12. As the carrier 1 moves through the transmission conduit 20 toward the first terminal 12, it causes the exhaust valve 70 to move to the open position (e.g., carrier 1 pushes air within conduit 20 on its first terminal side) and release air from the conduit 20 as illustrated by Arrow E. Once the carrier 1 passes the exhaust valve 70 the pressure A is relieved or exhausted through the exhaust valve 70 rather than pushing the carrier 1 along the transmission conduit 1. When the carrier 1 begins to reach the first end door 110 as shown in FIG. 4, a trapped column of air creates a pressure B that builds between the first end door 110 and one end of the carrier 1. As such, the pressure delta across the carrier 1 is positive on the first terminal side of the carrier 1. In other words, as shown in FIG. 4, the pressure B is now greater than the pressure A. This trapped column of air or positive pressure B creates an air brake which causes the carrier 1 to decelerate as it approaches the first end door 110. The system 10 requires no additional controls in order to have this breaking action.

Both the first and second terminals 12 and 14 may also include sensors 150 that are operable to detect when carrier one has reached the respective terminal and then signal the system 10 to discontinue operation of the first blower 30 and/or the second blower 40. This same sensor 150 or a second sensor may detect the presence of the carrier at the first terminal and automatically signal the first end door 110 to open. Exemplary sensors may include, but not be limited to, pressure sensors, contact sensors, pressure sensors, infrared sensors, electronic eye sensors, other sensors, and/or combinations thereof. In another embodiment, the system 10 may be configured to automatically terminate the operation of the first blower 30 when the teller and/or system 10 activate the opening of the first end door 110. In yet another embodiment, one or more sensors (not shown) such as those described above herein may be positioned at or near the exhaust valve 70 such that once the carrier passes the sensor (i.e., the exhaust valve 70), the operation of the first blower 30 may be terminated. Such control of the operation of the blower assists in minimizing the operation of the blower(s) to only the amount of time necessary to move the carrier 1 to the opposite terminal, thus making the system 10 more efficient and increasing the lifetime of the blower(s) and/or system 10.

Figure 5:
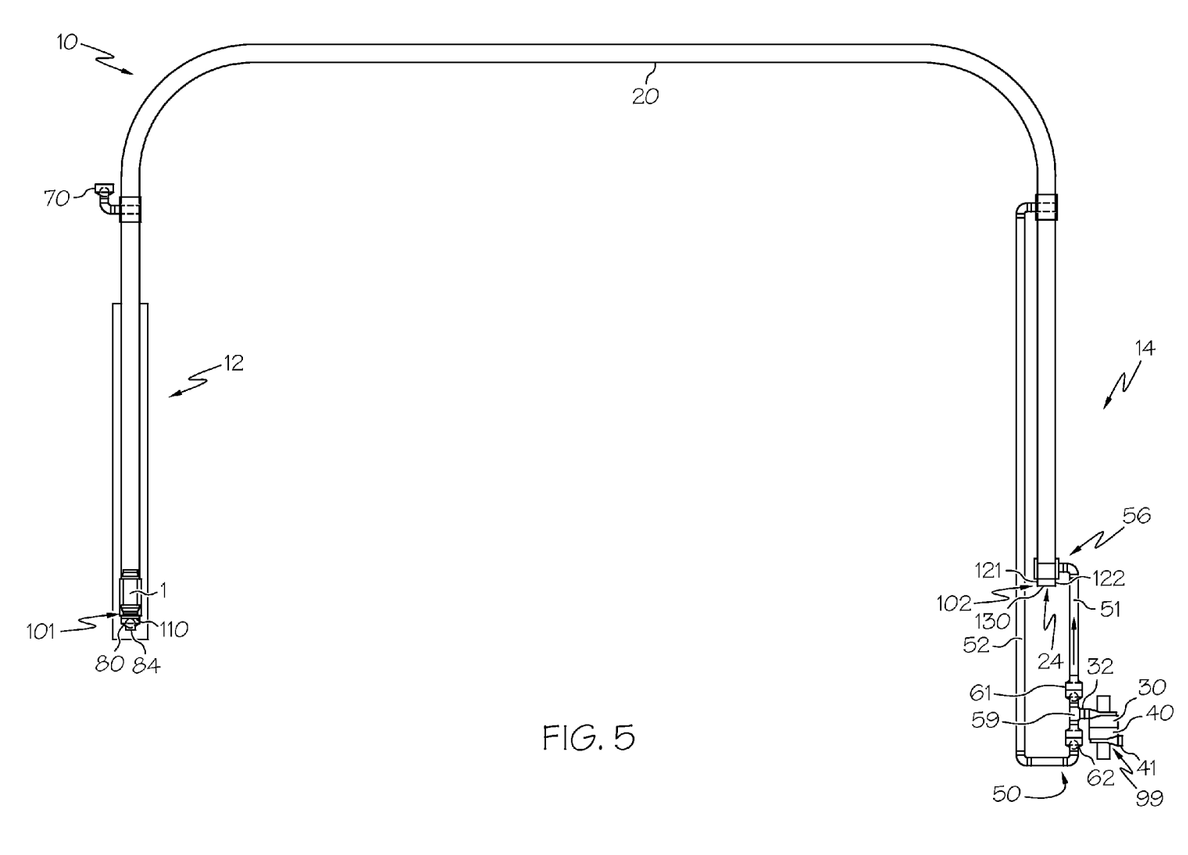
FIG. 5 is a schematic representation of a pneumatic transmission system illustrated in FIG. 1, showing the first terminal end door in the "open" position for loading and/or unloading of a carrier, the second terminal end door is in the "closed" position.

Referring to FIG. 5, after the carrier 1 has come to a stop, the first end door 110 may automatically open, or the system 10 may wait until a user activates the opening of the first end door 110 such as by pressing an 'open' button on a user interface. Once the first end door 110 is open, the carrier 1 may be removed from the transmission conduit 20 (See also FIG. 8A). When the first end door 110 is in the open position both the blowers 30 and 40 may be deactivated and all the check valves (e.g., first and second check valves 61 and 62, exhaust valve 70, and intake valve 80) may be in their closed position. The carrier 1 may be removed by a user (e.g., an employee such as a teller), and either items may be placed within the carrier 1, the contents of the carrier 1 may removed, and/or a combination of both actions may be performed.

Figure 6:
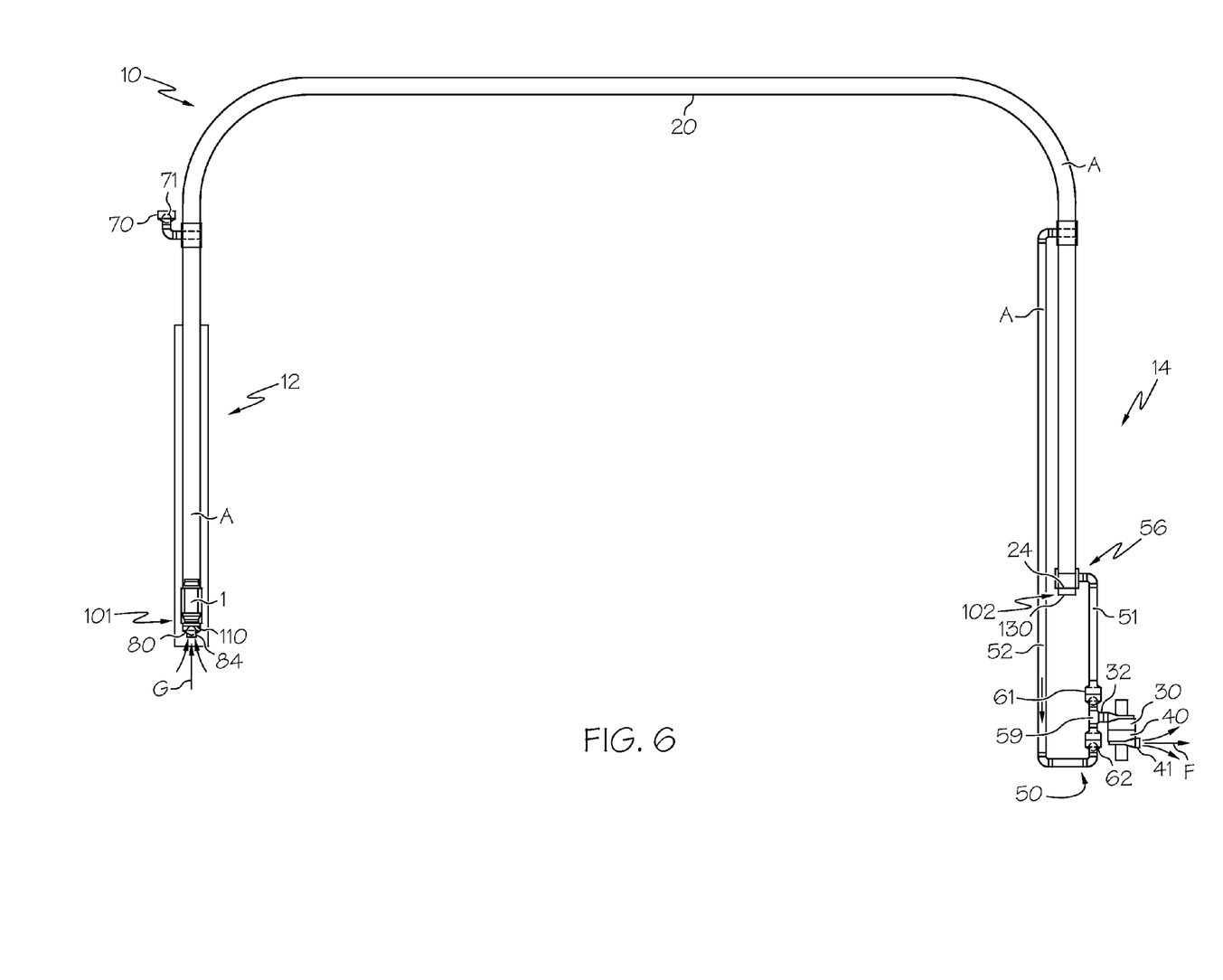
FIG. 6 is a schematic representation of pneumatic transmission system illustrated in FIG. 1, showing the second blower exhausting air from within the transmission conduit to create a reduced pressure in space A between the carrier and the customer terminal.
Figure 7:
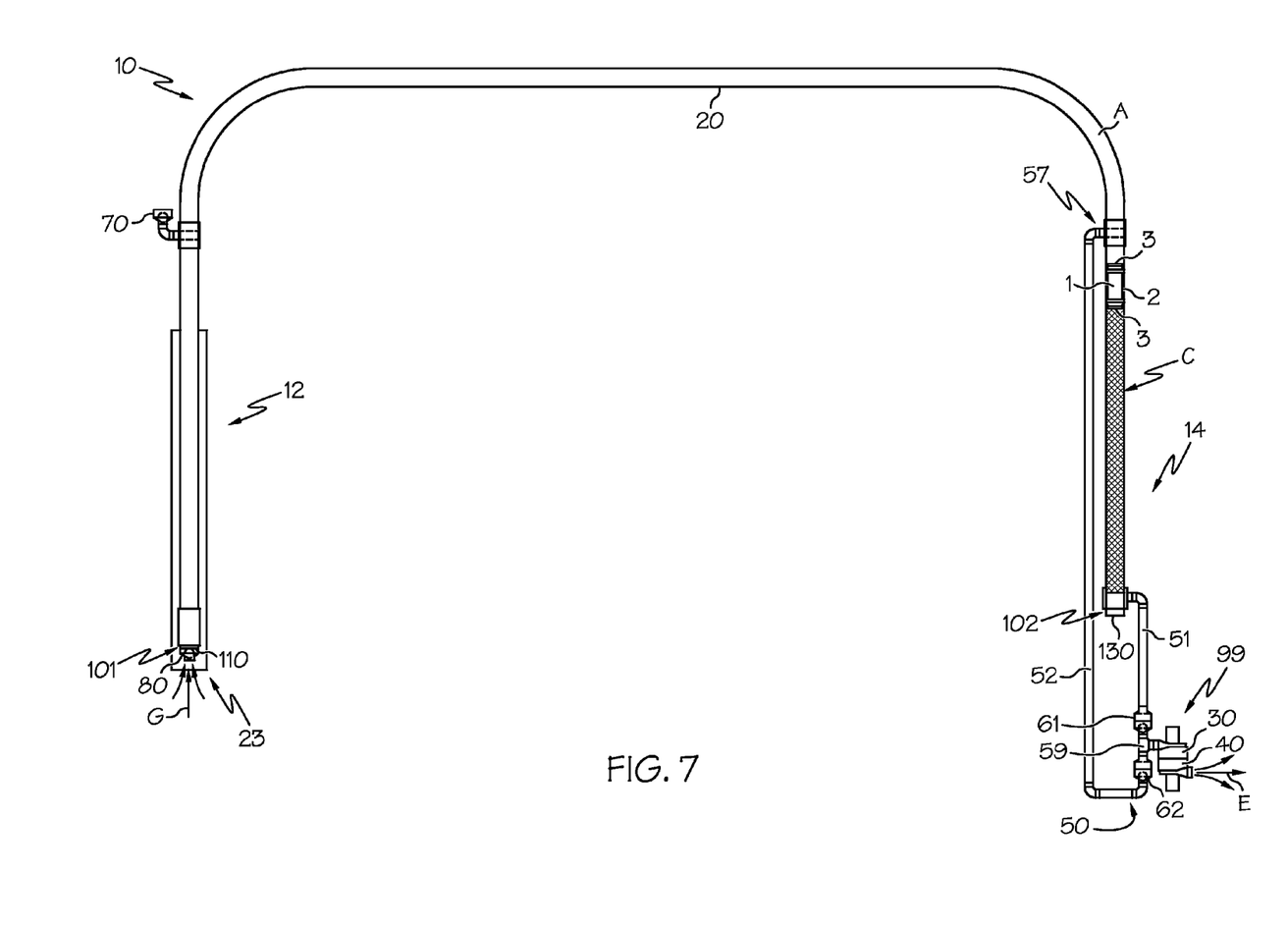
FIG. 7 is a schematic representation of a pneumatic transmission system illustrated in FIG. 1, showing the carrier arriving at the customer terminal.

FIGS. 6 and 7 show the system 10 and its operation when transferring the carrier 1 from the first terminal 12 to the second terminal 14. The carrier 1 may be placed on the first end door 110 and then the first end door 110 may be closed, moving the carrier 1 back into the transmission conduit 20 (See also FIG. 8). In the closed position, first terminal end door 101 may be at least partially inserted into the first terminal end opening 23, sealing the seal 112 against the inside surface 115. Once the first end door 110 is closed, the system 10 may be programmed to automatic activate the second blower 40 or a user may operate the second blower 40 (e.g., by pushing a "Send" button).

The second blower 40 begins drawing air (i.e., pulling a vacuum) through the first blower 30 and first blower outlet 32. This drawing of air by the second blower 40 causes the first check valve 61 to remain closed and the second check valve 62 to open (e.g., the ball disengages and unseals from the inlet of the second passageway 52). Thus, the second blower 40 draws air from the transmission conduit 20 on the second terminal side of the carrier 1 through the second passageway 52 at point 57, second check valve 62, second tee outlet 54, tee inlet 53, first blower 30, and second blower 40, and then out of the second blower inlet 41 as illustrated by Arrow F in FIG. 6. The air being exhausted by second blower 40 creates a negative pressure A between the second terminal side of the carrier 1 and the second end door 130, which begins to pull the carrier 1 from the first end door 110 and toward the second terminal 14.

As the carrier 1 begins to move away from the first end door 110 the volume of the space between the end of the carrier 1 and the first end door 110 increases and/or the negative pressure A may also draw air past the seals of the carrier, thus creating a negative pressure in the space between the carrier 1 and the ball 81 of the intake valve 80. At this point, the intake valve 80 has a positive pressure (i.e., ambient pressure) at the inlet 84 side of the valve (i.e., the ball 81) and the negative pressure on the carrier side of the valve (i.e., the ball 81), which causes a positive pressure differential across the valve 80. This positive pressure differential opens the intake valve 80 (e.g., causing the ball 81 to disengage and unseal from the inlet 84), thus permitting ambient air to flow into the first terminal end opening 23 via the passageway 83 as illustrated by Arrows G. This positive pressure (and/or air flow) on the first terminal side of the carrier 1 combined with the negative pressure on the opposite side of the carrier propels the carrier toward the second terminal 14. The negative pressure A also keeps the exhaust valve 70 in its closed position (e.g., the ball 71 is engaged and sealed against the conduit opening).

As shown in FIG. 7, once the carrier 1 passes the connection point 57 of the second passageway 52, the negative pressure A is now being drawn behind the carrier 1. In addition, the carrier 1 as it travels toward the second end door 130 begins to trap a column of air between its leading end and the second end door 130, causing a positive pressure C to build up. This positive pressure C, singularly or in combination with the negative pressure A behind the carrier 1 creates a pressure brake that decelerates the carrier 1 as it approaches the second end door 130. Once the carrier 1 reaches the second end door 130, the system 10 may automatically open the second end door 130 or the system may wait for a customer to push a 'open' button to operate the opening of the second end door 130. Once the second end door 130 is open, the customer may remove the carrier 1 and its contents, and/or place additional items within the carrier 1 to be transported back to the first terminal 12. When the second end door 130 is opened, the system 10 may be programmed to terminate the operation of the second blower 40. As set forth above, second terminal 14 may also comprise a variety of known sensors 150 to detect the approach and/or arrival of the carrier 1 and signal the termination of the second blower 40 and/or first blower 30. This same sensor 150 or a second sensor may detect the presence of the carrier at the second terminal and automatically signal the second end door 130 to open. When the second end door 130 is open, both of the blowers 30 and 40 are inactive and all valves (e.g., the first and second check valve 61 and 62, the exhaust valve 70, and the intake valve 80) are in the closed position. In another embodiment, the sensor 150 may be configured such that just after the carrier 1 passes the connection point 57 (or any other desired point), the sensor 150 signals the controller to shut off the second blower 40 and/or the first blower 30. This design enables the most efficient operation of the blower(s), thus increasing operational efficiency and decreasing unnecessary 'wear and tear' on the blower(s). The sensor 150 may be any sensor as shown and/or described herein.

Such a design permits the pneumatic carrier transmission system 10 to use end doors that do not require a controlled valve for controlled venting or intake. Thus, system 10, in this one example, does not include an end door having a third position permitting controlled venting, i.e., a 'closed but vented position', wherein the controller moves the end doors to close and seal the respective terminal end opening, but permits air to vent from or enter into the transmission conduit through vent ports disposed within the end doors 110 and 130. The first end door 110, including the intake valve 80, permits the first end door 110 to be closed and still permit air to enter into the first terminal end opening without having to have a controller and drive mechanism move the first end door 110 into a third position to vent. Thus, the exemplary first end door 110 may be a non-controlled valve door assembly or, in other words, a end door assembly having a non-controlled valve.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:

1. A blower assembly for a pneumatic carrier transmission system comprising:
   a first blower for supplying air;
   a second blower for exhausting air, wherein the first and second blowers are connected in series; and
   a dual passageway connecting device connected to and in communication with the first and second blowers, the dual passageway connecting device comprising
   a connecting tee having
      a tee inlet,
      a first tee outlet in communication with the tee inlet, and
      a second tee outlet in communication with the tee inlet,
   a first valve connected to and in communication with the first tee outlet,
   a first passageway connected to and in communication with the first valve,
   a second valve connected to and in communication with the second tee outlet, and
   a second passageway connected to and in communication with the second valve;
   wherein the first blower is operable to supply air through the first passageway and the second blower is operable to exhaust air through the second passageway.

2. The blower assembly according to claim 1, wherein:
   the first blower comprises an inlet and an outlet;
   the second blower comprises an inlet and an outlet; and
   the first blower inlet is directly connected to and in communication with the second blower inlet.

3. The blower assembly according to claim 1, wherein:
   the first blower comprises an inlet and an outlet;
   the second blower comprises an inlet and an outlet; and
   the outlet of the first blower is connected to and in communication with the tee inlet.

4. The blower assembly according to claim 1, wherein the first and second valves comprise check valves.

5. The blower assembly according to claim 4, wherein the first check valve is configured to open when the first blower supplies air.

6. The blower assembly according to claim 4, wherein the second check valve is configured to open when the second blower exhausts air.

7. The blower assembly according to claim 4, wherein the first and the second check valves comprise ball and cage check valves.

8. The blower assembly according to claim 1, wherein the first and second valves are non-controlled valves.

* * * * *